(No Model.)
W. O. SANDERS.
PLUMB LEVEL.
No. 592,833.   Patented Nov. 2, 1897.
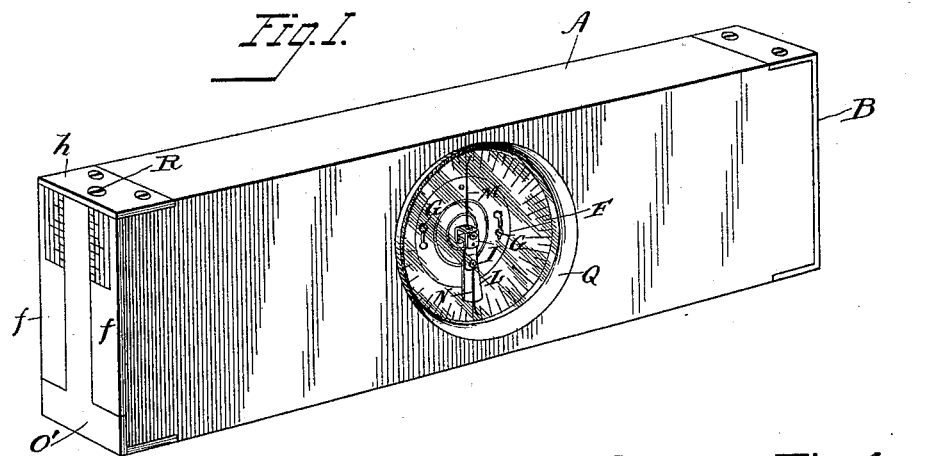
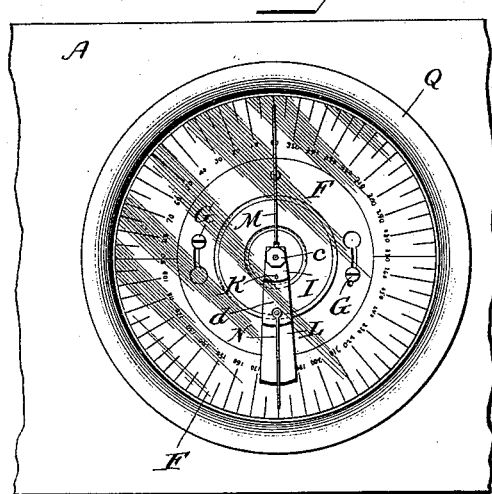
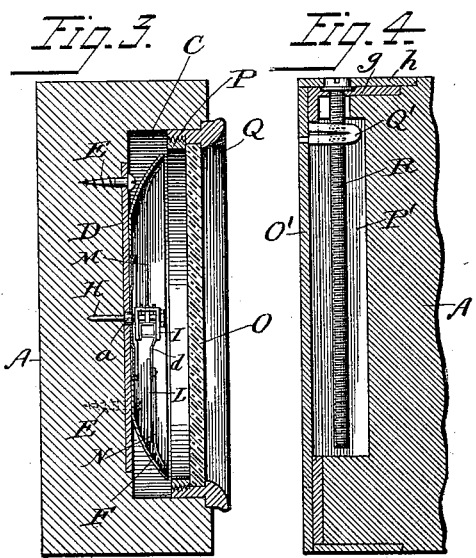
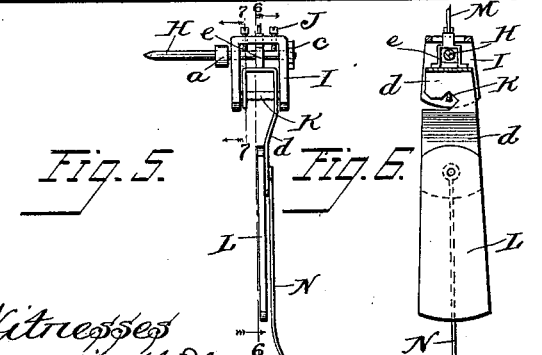
Witnesses
Martin H. Olsen.
Leonora Wiseman.
Inventor
William O. Sanders
by Edward Rector
his atty

UNITED STATES PATENT OFFICE.

WILLIAM O. SANDERS, OF OMAHA, NEBRASKA, ASSIGNOR OF TWO-THIRDS TO SAMUEL H. WALKER AND FRANK CHITTENDEN, OF SAME PLACE.

PLUMB-LEVEL.

SPECIFICATION forming part of Letters Patent No. 592,833, dated November 2, 1897.

Application filed December 7, 1896. Serial No. 614,695. (No model.)

*To all whom it may concern:*

Be it known that I, WILLIAM O. SANDERS, a citizen of the United States, residing at Omaha, in the county of Douglas, in the State of Nebraska, have invented a certain new and useful Improvement in Plumbs and Levels, of which the following is a description, reference being had to the accompanying drawings, forming part of this specification.

My invention relates to that class of plumbs and levels in which a pointer coöperating with a dial is employed to indicate the angle; and it has for its object the production of a plumb and level of this class which shall be more durable and efficient and in which the pointer shall be more delicately balanced and shall more quickly and accurately indicate the different angles than in plumbs and levels of this class heretofore made.

In the accompanying drawings, Figure 1 is a perspective view of a plumb and level embodying my invention; Fig. 2, an enlarged detail in front elevation of the middle portion thereof, showing the dial and pointer; Fig. 3, a middle vertical cross-section of Fig. 2; Fig. 4, a vertical cross-section through the stock of the instrument near the left-hand end thereof in Fig. 1, showing the adjustable plate upon the end and the means for adjusting the same; Fig. 5, an enlarged detail, in side elevation, of the devices for supporting and balancing the pointer; Fig. 6, a cross-sectional detail of the same on the line 6 6 of Fig. 5, and Fig. 7 a like detail on the line 7 7 of Fig. 5.

The same letters of reference are used to indicate identical parts in all the figures.

The stock A of the instrument may be of the usual size and shape, and preferably has one end and the corners thereof protected by the usual metal plate B, while the other is protected by the metal plates hereinafter described. In the front side of the stock A, at the middle thereof, there is provided a circular recess C of suitable size to receive and inclose the dial. Let into a shallow recess in the rear wall of the large recess C is a metal plate D, firmly secured in position by screws E E, Fig. 3. Secured to the outer face of this plate D is the dial F of concave form and shaped substantially like a shallow dish or saucer. This dial is adjustably secured to the plate D by means of screws G G passing through curved slots in the dial and entering the plate D, as seen in Figs. 1 and 2. The slots in the dial terminate at one end in enlarged circular openings of a diameter greater than that of the heads of the screws G, so that the dial may be readily removed by slightly loosening said screws and then turning it until said openings are brought beneath the heads of the screws, this means permitting the removal and replacement of the dial without entirely removing the screws.

In assembling the parts of the instrument the provision of the curved slots in the dial and the screws G G permit the dial to be accurately adjusted to proper position and then firmly secured in such position by tightening up the screws. The dial is provided with the usual graduations representing degrees, which may be numbered in the usual or any desired manner. In the present instance they are numbered in regular order from right to left around the dial through the full three hundred and sixty degrees.

Passing through the center of the dial and plate D and driven firmly into the stock A, Fig. 3, is the post or pin H, upon which the pointer coöperating with the dial is mounted. This post in the present instance has a circular enlargement *a* formed upon it, which fits a corresponding opening in the center of the dial and plate D to more firmly hold the post in true position and for a further purpose hereinafter mentioned. Hung upon the projecting outer end of the post H is a frame I, consisting of a thin plate bent to the shape of three sides of a rectangle, with its free ends depending below the post. The vertical front and rear sides of this frame I are provided with openings *b*, Fig. 7, through which the post H passes. These openings are somewhat larger than the post and in the present instance are square, and the frame I is not supported directly upon the post by the upper edges of the openings *b b* resting upon the post, but by two adjustable screws J J, passed through the horizontal upper side of the frame I and having their lower ends pointed or rounded and resting upon the upper side of the post H. The frame I is thus delicately balanced upon the post H and supported entirely by the lower ends of the screws J J, by which latter it may be adjusted to true position. It is held from longitudinal movement on the post by being confined between the front side of the enlargement a, heretofore described, and a nut c, screwed upon the outer end of the post. The enlargement a projects outwardly slightly beyond the surface of the dial F and holds the rear side of the frame I from contact with the dial and thereby prevents the friction which would otherwise occur between it and the frame I.

Supported at its opposite ends in the lower ends of the vertical sides of the frame I is a knife-edge bearing K, upon which is suspended a pendulum L. The upper end of the pendulum L in this instance consists of a thin plate d, secured at its lower end to the upper end of the thicker and heavier plate constituting the lower end of the pendulum L, and having its upper end bent into shape approximating that of the frame I and adapted to fit between the depending vertical sides of the latter. The front and rear sides of this bent upper end of the plate d are provided with notches adapted to fit over and rest upon the knife-edge bearing K, the notches being cut at a more obtuse angle than that of the upper side of the bearing K, as seen in Figs. 6 and 7, so as to delicately balance the plate d and pendulum L upon said bearing and yet prevent displacement of them therefrom.

Secured to the horizontal upper end of the plate d is a bracket e, to whose upper side is secured the pointer M, the latter passing upward through a large opening formed in the upper horizontal side of the frame I, as seen in Fig. 6, which opening will accommodate the vibrations of the pendulum and pointer upon the knife-bearing K. The post H passes through the bracket e, and in assembling the parts the frame I and pendulum and pointer will first be assembled and the frame I be then slipped over the outer end of the post H, the latter passing through the openings b in the vertical sides of the frame and through the bracket e, and the nut c being then applied to the end of the post H to hold them in position. The notch in the vertical front side of the upper end of the plate d of the pendulum, Fig. 6, is formed at the inner end of a slot extending inward from the edge of the plate d, which slot permits the assembling of the frame I and the pointer and pendulum in the manner above described.

The pendulum L preferably has secured to it a second vertically-depending pointer N to coöperate with the lower part of the dial simultaneously with the coöperation of the pointer M with the upper part thereof.

The dial and pointer are protected by a circular glass plate O, confined by a screw-collar P in a circular metal frame or ring Q, which is fitted tightly in the outer end of the recess C.

From the foregoing description it will be seen that the pointer coöperating with the dial is mounted upon and carried by a doubly-pivoted support, the frame I being first delicately pivoted or balanced upon the post H, while the pendulum which carries the pointer is in turn balanced upon a knife-edge bearing carried by this pivoted frame. The result of this double pivoting or balancing of the pointer is that it responds much more quickly and accurately to slight variations in the angle of the level than where a pointer mounted upon a single pivot is employed, and likewise comes to rest after vibrations more quickly than a singly-pivoted pointer will.

The lower pointer N is provided for the purpose of enabling the angle to be readily seen whether the level is above or below the eye of the workman. In the use of the ordinary spirit-level, if the level is used at a point considerably above the eye of the workman, it is difficult for him to see the air-bubble in the glass tube, while in the use of pointer and dial levels having only a single pointer it is difficult for the workman to see the upper end of the pointer when the level is some distance below his eye. By the use of my double pointers and the dish-shaped dial the angle may be readily seen by him in any position in which the level is placed.

It will of course be understood that the instrument may be used either as a plumb or level, since when the stock is placed in vertical position the pointer and its supports upon the post H will simply swing around ninety degrees upon said post from the position they occupy when the instrument is in horizontal position, and variations from vertical position will be indicated by the pointers by their respective variations from the ninety degree and two hundred and seventy degree marks from the dial.

Among the advantages of my instrument over the ordinary spirit plumb and level is, first, that it will indicate the exact angle of variation, which is not the case with the spirit instruments, and, second, it is more durable than such instruments, since the glass tubes in the latter are usually set in plaster-of-paris, which is affected by heat and moisture, and which, when subjected to the exposure incident to some classes of work in which plumbs and levels are used, quickly cracks and throws the spirit-tube out of position and destroys the efficiency of the instrument.

Another feature of my new instrument not heretofore mentioned is the provision of an adjustable plate at one end of it by which the instrument may be adjusted or set for work at any desired angle, as where it is desired to lay a floor slightly inclined from horizontal position, or where it is desired to use the instrument on work slightly inclined from vertical position. Of course the inclination in such cases would be indicated upon the dial without the adjustment I am about to describe; but in such cases the angle from vertical or horizontal position, as indicated upon the dial, would have to be constantly noted, whereas by adjusting the end of the instrument so that the stock will stand in true horizontal or vertical position when placed upon the inclined surface the pointer will stand at zero or initial position when the surface of the work is at the desired angle. This adjusting means consists of a sliding metal plate O', suitably mounted in a guideway upon the end of the stock, in the present instance by being provided with a vertical tongue extending upward from its lower portion, which is the full width of the end of the stock, and fitting between metal plates $f f$ at that end of the instrument, Fig. 1. The end of the stock is provided with a vertical recess P' opposite the upper end or tongue of the plate O', Fig. 4, into which recess projects a lug Q' upon the inner face of said plate O'. This lug is provided with a threaded opening through which passes a long screw R. The upper end of this screw has a head which is provided with a flange confined between two metal plates $g h$, secured to and set in the upper edge of the stock. The flange of the screw is seated in a recess in the lower one of these plates $g$, while the opening in the plate $h$ is just large enough to accommodate the head of the screw, whose upper surface is flush with the upper surface of said plate. By turning this screw R with a screw-driver the plate O' may be forced downward and its lower end projected below the stock of the instrument to any desired degree, so that when the lower edge of the instrument is placed upon surface inclined from horizontal or vertical position to a degree corresponding to the projection of the plate the stock of the instrument will be in true horizontal or vertical position and the pointers at zero or initial position. The plates $f f$ at the opposite sides of the tongue of the plate O' may be provided with graduations, as seen in Fig. 1, coöperating with the upper end of the plate O' to indicate the degree of movement of said plate from normal position, and consequently the angle which such movement of the plate O' will throw the instrument out of true horizontal or vertical position when applied to a horizontal or vertical surface. If it be desired to use the instrument in laying a floor inclined ten degrees from the horizontal, the plate O' will be adjusted so that the pointer will stand at initial position upon the dial when the instrument stands at ten degrees from horizontal or vertical position, and thus in using the instrument the workman simply notes that the pointer stands in initial position, which will indicate to him that the surface of the work is at the desired angle.

The pendulum which carries the pointer in my improved instrument is of sufficient weight and has sufficient limit of movement upon the knife-edge bearing which supports it to cause it to continue to hang in approximately vertical position, even if the upper edge of the instrument be tilted slightly forward or backward, and this fact may be utilized for the purpose of stopping the lateral vibration of the pendulum and pointer upon their pivotal support and bringing them quickly to rest. Thus when the instrument is placed upon an approximately horizontal surface and it is not desired to wait until the pendulum and pointer come to rest from their lateral vibrations the upper edge of the instrument may be tilted slightly forward, which will cause the upper side of the dial to come into frictional contact with the rear side of the upper end of the pointer M, the latter, as before stated, remaining in approximately vertical position during such tilting movement. This frictional contact between the pointer and dial will arrest the vibrations of the pointer and pendulum and cause them to quickly come to rest to indicate the angle of inclination of the surface upon which the instrument rests. The same result may be accomplished by tilting the upper edge of the instrument slightly rearward, in which case the lower pointer N will come in contact with the lower surface of the dial with the same result. So, too, when the instrument is used as a plumb the same result may be accomplished by tilting the upper end of the instrument forward or backward, as will be readily understood.

I am aware, as before indicated, that plumbs and levels embodying pointers and dials instead of spirit-tubes are old, and I am also aware that it is old to provide one end of the stock of such an instrument with an adjustable plate for setting the instrument at different angles, and I therefore do not broadly claim these features as being entirely novel with me; but,

Having thus fully described my invention, I claim—

1. In a plumb and level, the combination, with the dial F and the central post H, of the frame I having the openings $b$ through which said post passes and provided with the adjustable screws J resting at their lower ends upon the upper side of said post, by which screws the frame I is supported upon said post, the pendulum L hung in the frame I, and the pointer M carried by the pendulum and coöperating with the dial, substantially as described.

2. In a plumb and level, the combination, with the dial F, and the post H provided with the collar or enlargement $a$ and with a threaded outer end, of the frame I provided with the openings $b$ through which the post H passes, and with the adjustable screws J passed through the horizontal upper side of the frame I and resting at their lower ends upon the post H, the nut $c$ screwed upon the outer end of the post and confining the frame I thereon between said nut and the collar $a$, the pendulum L hung in the frame I, and the pointer M carried by the pendulum and coöperating with the dial, substantially as described.

3. In a plumb and level, the combination, with the dial F and the central post H, of the frame I supported upon said post by the screws J and provided with the knife-edge bearing K, the pendulum L hung upon said bearing K, and the pointer M carried by the pendulum and coöperating with the dial, substantially as described.

4. In a plumb and level, the combination of the stock A provided with the circular recess C, the dish-shaped dial F secured to the bottom or rear wall of said recess, a pointer pivotally mounted in a swinging frame hung in front of the dial upon a central post projecting therefrom at the center of the dial and coöperating at its outer end with the graduations around the periphery of the dial, and the protecting-glass O mounted in the removable frame Q fitted in the outer end of the recess C, substantially as described.

5. In a plumb and level, the combination of the stock A having the circular recess C, the plate D fixed in the bottom or rear wall of said recess, the dish-shaped dial F adjustably secured to the plate D by the screws G G passing through slots in the dial and entering the plate D, a pointer pivotally mounted at the center of the dial and coöperating at its outer end with the graduations on the dial, and the protecting-glass O mounted in the frame Q fitted in the outer end of the recess C, substantially as and for the purpose described.

WILLIAM O. SANDERS.

Witnesses:
   THOMAS S. FERGUSON,
   CHARLES H. SATTERFIELD.